United States Patent
Louks

[15] 3,698,574
[45] Oct. 17, 1972

[54] PROCESS AND APPARATUS FOR SPREADING GRANULAR MATERIAL

[72] Inventor: Robert A. Louks, Gilman, Iowa 50106

[22] Filed: June 18, 1970

[21] Appl. No.: 47,402

[52] U.S. Cl. ............... 214/17 CB, 214/152, 222/66, 239/687
[51] Int. Cl. ............................................. B65g 65/32
[58] Field of Search .............. 214/17 CA, 17 CB, 152; 198/128; 302/60; 239/676, 687; 222/66

[56] References Cited

UNITED STATES PATENTS

| | | |
|---|---|---|
| 3,262,586 | 7/1966 | Smiley et al. ........... 214/17 CB |
| 3,170,264 | 2/1965 | Waldrum ............... 239/687 X |
| 3,094,334 | 6/1963 | Middleton et al ...... 198/128 X |
| 1,892,790 | 1/1933 | Smelser .................. 222/66 X |
| 2,822,097 | 2/1958 | Lee ........................ 214/17 CB |

Primary Examiner—Robert G. Sheridan
Attorney—Henderson & Strom

[57] ABSTRACT

This invention relates to a process and an apparatus for spreading granular material for use primarily in a conventional circular storage bin having a floor and a material evacuating unit: the apparatus having a hopper for receiving the material dumped therein through a roof opening by a conventional elevator, and having further a vertically adjustable rotatable pan disposed beneath the hopper for receiving and holding the material, with the upper edge of the pan outer wall disposed above the lower edge of the hopper bottom whereby the pan is not rotated, the pan will fill up with the material and then the throat of the hopper will clog with the material, and including further motorized means operable to rotate the pan so that the material is thrown outwardly of the pan by centrifugal force, the material then falling on the bin floor in a level manner.

A switch device is built into one side of the hopper and is responsive to material clogging up the hopper to automatically turn on the motor so as to rotate the pan, thus insuring that no material is discharged into the bin unless the spreader is operating at full capacity.

5 Claims, 7 Drawing Figures

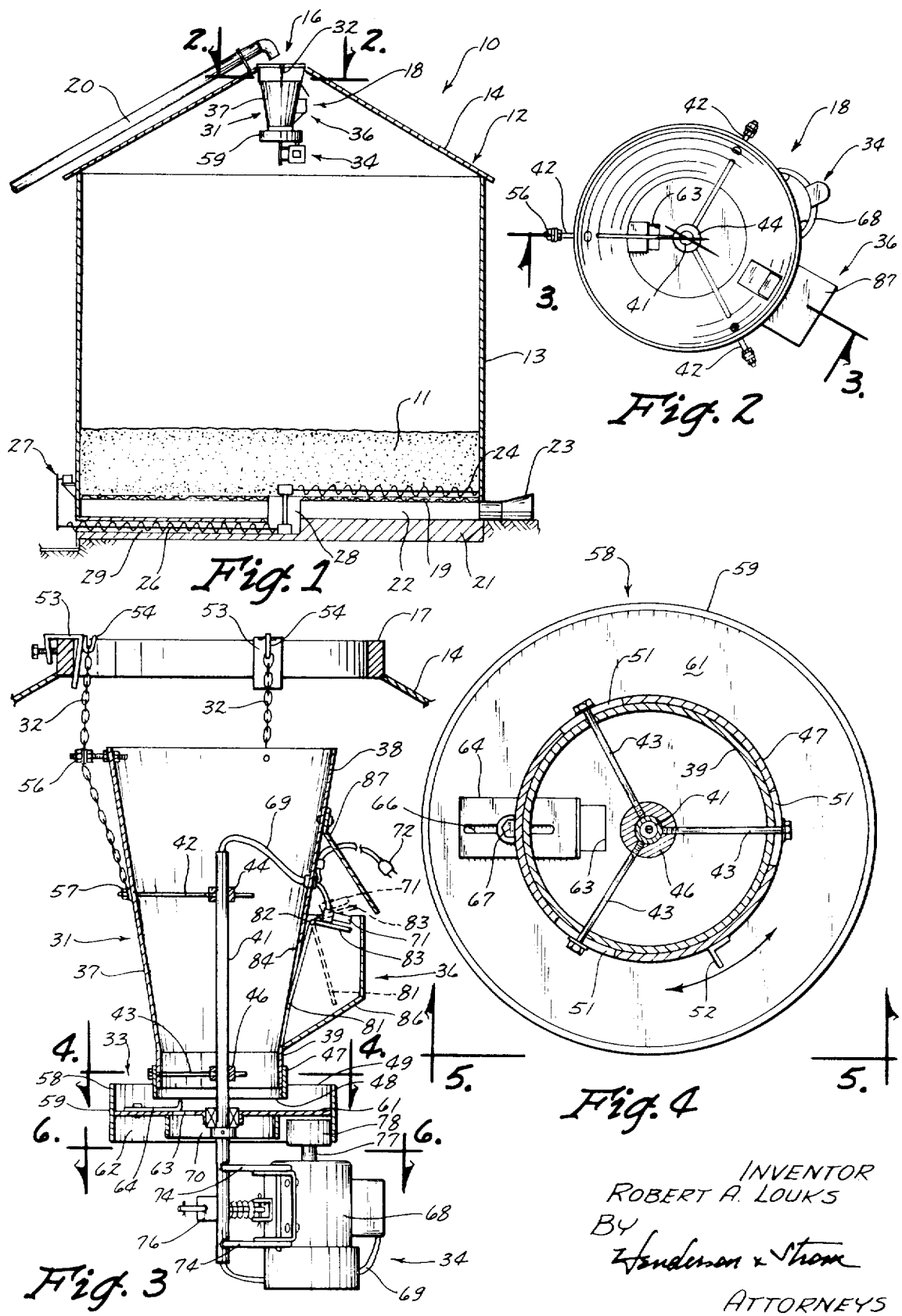

PATENTED OCT 17 1972　　3,698,574

INVENTOR
ROBERT A. LOUKS
BY
Henderson & Shaw
ATTORNEYS

PROCESS AND APPARATUS FOR SPREADING GRANULAR MATERIAL

BACKGROUND OF THE INVENTION

This invention relates generally to granular material dryers for use within a conventional circular storage bin having a floor, a sweep auger, a discharge auger for removing the granular material dumped into a sump opening by the sweep auger, and an air treatment apparatus wherein normally heated air is forced beneath the perforated floor of the bin, from whence the air moves upwardly through the floor and any material that is on top of the floor, the air picking up moisture from the granular material as it moves upwardly and from whence it is exhausted to the atmosphere through the upper part of the bin.

To applicant's knowledge, there is only one type of process and apparatus for spreading granular material in a drying bin involving a spinner-type apparatus. This apparatus includes a hopper for receiving granular material at the top, from an elevator which discharges the material through a bin hatch opening, and at the bottom of the hopper is provided a fan like device comprised of a plurality of blades which upon rotation strike the granular material and throw it outwardly in all directions where upon it falls upon the floor of the bin.

Applicant has ascertained several disadvantages in this type of system and apparatus. One is that the device operates at all times regardless of the amount of granular material in the hopper, whereupon the pattern of the grain as it falls into the bin is not constant and the layer which is laid on the perforated floor is not level. Secondly, as the granular material is discharged by being struck, a high rating of the motor is required as compared to a low capacity of the structure. Furthermore, it is known that striking grain damages it, immediately reducing its quality and value.

To overcome these disadvantages, applicant has provided that the spreader will not operate unless material is in the hopper at all times, such that a full capacity of the granular material is discharged at all times providing a constant pattern and a level fall of the material. Secondly, by using centrifugal force to spin out the material, a horse power rating of the motor lower than that of the contemporary spreader is possible, along with an increased capacity.

Additionally, by the adjustability of the relationship of the pan to the hopper, the capacity of the spreader can be readily changed. This is advantageous in matching the capacity of the spreader to the capacity of the auger or elevator which is feeding the granular material into the hopper.

SUMMARY OF THE INVENTION

This invention relates to a process and an apparatus for spreading granular material in a circular storage bin having a wall, a lower perforated floor spaced above a base floor, a rotatable sweep auger for removing material from about the perforated floor, a discharge auger for discharging the removed material to a point exterior the bin, and a heater-blower unit for forcing the heated, dry air through the perforated floor and into the granular material resting on top of same; the invention going particularly to the spreader apparatus which comprises a funnel shaped hopper having a large open end directly below the opening in the apex of the bin roof, with the hopper tapering downwardly to a smaller lower end beneath which is a circular pan concentrically and rotatably mounted relative to the center of the hopper, the pan adapted to receive material from the hopper, fill up, and then clog the lower throat of the hopper such that when the pan is not rotating, granular material will not flow through the hopper.

Means responsive to their being granular material in the hopper is provided for rotating the pan so as to discharge the material in a 360° circle about the pan, throwing the material so that it falls on to the floor, some of the material striking the bin wall and bin roof whereby the material on the floor piles up with the top layer level for the most efficient use of the drying equipment.

It is an object of this invention to provide a novel process for spreading granular material in a conventional circular storage bin.

It is another object of this invention to provide a novel apparatus for spreading granular material within a conventional circular storage bin.

It is another object of this invention to provide an apparatus for spreading granular material wherein the apparatus does not operate unless it is spreading material at a constant rate.

It is yet another object of this invention to provide a granular material spreading apparatus wherein the apparatus is capable of retaining and holding the granular material when the apparatus is inoperable.

It is still another object of this invention to provide a granular material spreading apparatus utilizing the advantages of centrifugal force in the spreading of the granular material as compared to striking and thereby throwing the granular material.

It is a further object of this invention to provide an improved process for spreading granular material wherein the material is directed downwardly in a controlled manner as it is dumped into the bin, is caught and held at a certain point as it falls, is piled up so as to prevent further material from falling through that which is caught and held, is then thrown outwardly about a 360° circle by the use of centrifugal force, whereupon the material falls to the floor of the bin for drying purposes.

Yet another object of this invention is provide a process for spreading granular material within a conventional drying bin, which process comprises the steps hereinbefore enumerated, and which can include the granular material striking either or both the bin roof and the side walls prior to its falling to the floor of the bin.

A further object of this invention is to provide a granular spreading apparatus that is capable of fulfilling the aforementioned objectives, and which is simple in use, economical of manufacture, and efficient in operation.

These objects and other features and advantages of this invention will become readily apparent upon referring to the following description when taken into conjunction with the accompanying drawings.

BRIEF DESCRIPTION OF THE DRAWINGS

FIG. 1 is an elevational view of the interior of a conventional grain bin within which the granular spreader apparatus of this invention has been installed, with certain parts broken away and others shown in section for clarity of illustration:

FIG. 2 is an enlarged plan view of the spreader apparatus of this invention as taken along the line 2—2 in FIG. 1;

FIG. 3 is a vertical, cross-sectional view as taken along the line 3—3 in FIG. 2;

FIG. 4 is an enlarged horizontal cross-sectional view as taken along the line 4—4 in FIG. 3;

DESCRIPTION OF THE PREFERRED EMBODIMENT

Figures 5, 6:
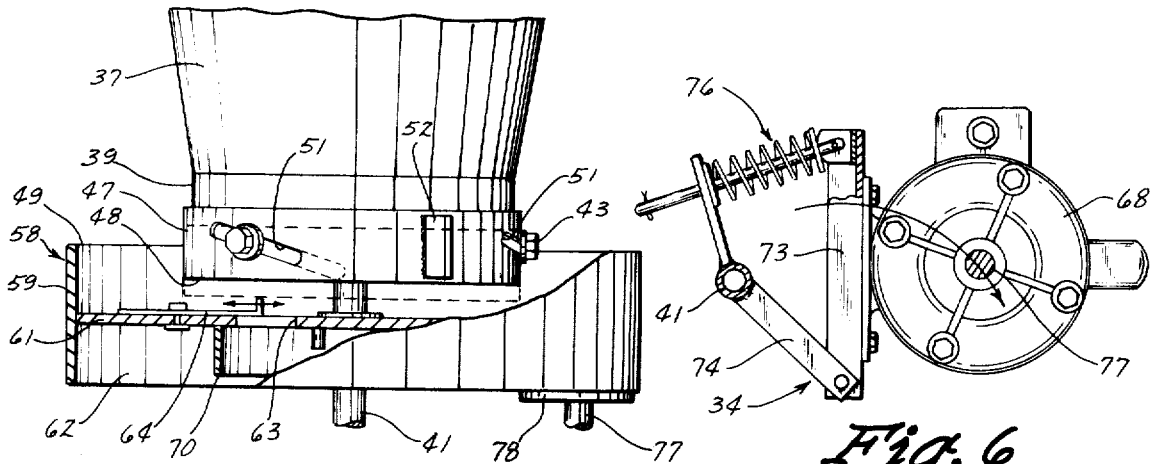
FIG. 5 is a side elevational view of a portion of the spreader apparatus as taken along the line 5—5 in FIG. 4, and with certain parts in cross-section and others broken away for clarity of illustration.
FIG. 6 is a plan view of the drive motor unit of this invention as taken along the line 6—6 in FIG. 3.
Figure 7:
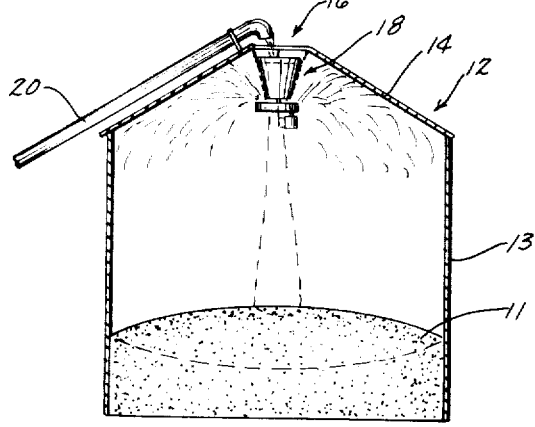
FIG. 7 is a reduced elevational view of the interior of the grain bin, with certain parts eliminated for clarity of illustration.

Referring now to the drawings, an apparatus for treating granular materials of this invention is indicated generally at 10 in FIG. 1, and is used primarily for the drying, curing, aeration and storage of granular material 11.

The apparatus 10 includes a conventional circular drying bin 12 (FIG. 1) having a side wall 13 and a conically shaped roof 14 mounted thereon. An opening 16 is formed in the apex of the roof 14 and has a bin hatch 17 (FIG. 3) secured thereabout. The spreader assembly 18 of this invention is suspended from the bin hatch 17 and will be described hereinafter in detail.

The spreader assembly 18 receives material from an elevator 20 (FIG. 1), and upon operation discharges the material outwardly and upwardly so that the material, some of which strikes the under surface of the roof 14 and the inner surface of the sidewall 13, falls downwardly upon a perforated floor 19 so as to form a substantially level layer of material.

The floor 19 (FIG. 1) is supported above a concrete base 21 for the bin 12, whereby a chamber 22 is formed therebetween and into which treated air is blown by means of a heater-blower unit 23. When desirable to discharge the granular material from the bin 12, a conventional sweep auger 24 is operated in conjunction with a discharge auger 26 by means of a drive motor assembly 28, and whereby the material is removed from the interior of the bin downwardly through a sump opening 28, and outwardly through a tunnel 29 within which the discharge auger 26 is mounted. The discharged granular material is then removed from the outer end of the discharge auger 26 by any conventional means.

Referring now particularly to FIGS. 2 - 6 inclusive, one embodiment of the spreader assembly 18 of this invention is illustrated which comprises basically a hopper unit (FIG. 3) indicated generally at 31 and which is supported by a plurality of chains 32 to the bin hatch 17, and includes further a rotatably mounted pan unit 33 at the bottom of the hopper unit 31, a pan rotating unit 34 disposed beneath said pan unit 33, and a pan rotating control unit indicated generally at 36 for operating the pan rotating unit 34 only when the pan unit 33 is filled with granular material and when the material also extends upwardly into the hopper unit 31 a predetermined distance.

The hopper unit 31 (FIG. 3) comprises a funnel shaped, circular hopper 37 which has an open inlet end 38 directly below and concentrically arranged with the bin hatch 17, and includes further an open discharge end 39 of a diameter smaller than that of the inlet end 38. The hopper 37 is mounted with its longitudinal axis in a generally vertical disposition, and is secured to an elongated tube 41 by an upper trio of rod devices 42 (FIGS. 2 and 3), and by a lower trio of rod devices 43 (FIG. 4), both groups of devices 42 and 43 secured at their inner ends to a pair of bushings 44 and 46 which are fixed to the tube 41.

Referring to FIGS. 4 and 5, it is noted that the discharge end 39 of the hopper 37 is not funnel shaped itself, but has a constant diameter for a short length, and is frictionally embraced by a circular feed control band 47, the lower edge 48 of which is always maintained below the upper edge 49 of the pan unit 33. The purpose of this will be described hereinafter. The feed control band 47 is provided with a trio of diagonally formed slots 51 through which extend the lower trio of rod devices 43. A rotating lug 52 is secured to the band 47, whereby upon striking the lug 52, the feed control band 47 is rotated about the discharge end 39, and with the rod devices 43 coacting within the slots 51 to either move the band 47 vertically upwardly or downwardly on the discharge end 39, depending upon the direction which the lug 52 is driven.

The hopper unit 31 is suspended at a variable distance below the bin hatch 17 by means of the chains 32, and wherein the upper end of each chain is secured to a hook 53 (FIG. 3) which is an intregal part of a clamp 54 secured in turn to the bin hatch 17. Intermediate the length of each chain, the chain is fastened to an adjusting device 56 which is secured to the inlet end 38 of the hopper 37. The lower end 57 of each chain is secured to the outer end of an upper rod device 42. By this arrangement, not only is the vertical distance of the hopper 37 adjustable relative to the bin hatch 17, but also it is secured so that the tube 41 is vertically disposed. This positions the spreader assembly 18 for its most efficient operation.

The pan unit 33 comprises a circular pan 58 best illustrated in FIGS. 4 and 5, which pan 58 is concentrically mounted relative to the tube 41 and comprises an upper wall 59 extending above a flat bottom or floor 61. A depending drive flange 62 is provided and it will be noted that the upper edge 49 of the upper wall 59 extends above the lower edge 48 of the feed control band 47.

An opening 63 (FIG. 4) is formed in the floor 61 in an offset manner relative to the center thereof, and can be completely covered or uncovered as the case may be by a slide plate 64 having a slot 66 therein through which a fastener 67 secures the slide plate 64 to the floor 61 of the pan 58. Depending below the floor 61 and secured thereto, so as to encompass the opening 63, is a depending wall 70 of a diameter smaller than the diameter of the upper pan wall 59. The purpose of this depending wall 70 is to direct granular material falling through the opening 63 in a certain downward direction and to cover a certain area.

The pan rotating unit 34 of the spreader assembly 18 comprises a motor 68 (FIGS. 3 and 6), which is electrically connected by a cord 69 extending through the tube 41, and which cord 69 is connected to a switch 71, a part of the pan rotating control unit 36, and with the cord having a male end 72 for connection to a source of electrical energy at a position preferably outside the bin 12 for easy operator control.

The motor 68 is secured by a bracket 73 and a pair of arms 74 to the lower end of the tube 41, and is biased outwardly by a spring and rod unit indicated generally at 76 in FIG. 6. Extending in an upright, vertically disposed manner is an output shaft 77 (FIG. 3) of the motor, and secured to the upper end thereof is a hard rubber roller 78. The biasing arrangement is such that upon operation of the motor 68, rotation of the roller 78 provides a frictional drive against the inner surface of the drive flange 62, whereby the pan is rotated about a bearing 79 upon which it is mounted, and with the bearing 79 being secured to the tube 41.

The pan rotating control unit 36 is best illustrated in FIG. 3, and includes a plate 81 which is pivotally mounted at 82 to a receptacle 86, with the plate 81 normally leaning toward the hopper 37 as illustrated in full lines in FIG. 3. The plate 81 partially encloses a chamber open to the interior of the hopper 37 by means of an opening 84 formed in the side thereof. A support 83 is formed integral with the plate 81 and pivots therewith, and carries the mercury switch 71, which switch closes a circuit to the drive motor 68 when in the dotted line position of FIG. 3, and which switch 71 opens the circuit to the motor so as to render same inoperable when the plate 81 is resting against the hopper 37.

The operation of the pan rotating control unit 36 is such that upon grain being discharged into the hopper 37 by the elevator 20, the material is directed downwardly by the hopper 37 and is then caught and held by the pan 58. As the lower end 48 of the hopper 37 is below the upper edge 49 of the pan, the end 48 will be filled before any appreciable granular material spills over the side of the pan 58. The material then backs up in the clogged hopper 37 until the plate 81 is forced backward and in a counterclockwise direction as viewed in FIG. 3. At that time the switch 71 operates to close the circuit, whereupon the motor 68 operates to rotate the pan unit 33.

Rotation of the circular pan 58 throws the granular material upwardly and outwardly therefrom due to centrifugal force, whereupon the granular material either falls directly to the floor 19 of the bin 12, or strikes the sidewall 13 of the bin, thence falling to the floor 19, or strikes the underside of the roof 14 and thence falls to the floor 19. It is conceivable that some of the granular material may actually strike both the roof 14 and the bin sidewall 13 prior to the floor 19. By this arrangement, the granular material is spread on the entire bin floor 19 in a substantially level manner for the most efficient utilization of the drying and treatment thereof.

In certain instances, it is desirable to have the pan floor opening 63 somewhat uncovered by the slide plate 64 so as also to discharge granular material through that opening 63 for covering a portion of the central area of the bin floor 19 or a layer thereon, and for insuring a level condition of the upper portion of the layer of grain. Although when the opening 63 is not completely covered some granular material falls through same, it has been found that particularly with the use of corn and like particulate materials, this opening will also clog when the pan is not being rotated.

If a larger elevator auger 20 is used, or if the operator desires to increase the rate of discharge in granular material through the spreader assembly, the feed control band 47 can be rotated so as to raise its lower edge 48, and space it further upwardly from the pan floor 61. It can readily be appreciated that the higher away from the floor 61 the lower edge 48 of the band 47 is, the greater the quantity of granular material which is spun away by the rotating pan 58. Tests have shown that 3,000 bushels of corn per hour can be discharged through the spreader assembly 18, using a one-half horsepower motor 68.

A further adjustment for changing the capacity of the spreader assembly is provided, in that the rod device bushings 44 and 46 can be moved on the tube 41 so as to vertically reposition the entire hopper 37 relative to the pan 58, providing therefore this adjustment in addition to the capacity adjustment of the feed control band 47.

As soon as the elevator 20 ceases discharging granular material into the spreader assembly 18, such that the level of the granular material within the hopper 37 drops below the pivotal plate 81, the plate will swing to its normal full line position of FIG. 3, thus stopping the motor 68 prior to a complete removal of all granular material from the spreader assembly. By this arrangement, wherein the motor 68 never operates unless a predetermined rate of granular material is spread, a level layer of material in the bin is always insured.

I claim:

1. In an enclosed grain bin having a floor, a wall, a roof, and an opening central of the roof adapted to have particulate material dumped therethrough, an assembly for spreading the particulate material evenly on and above the floor comprising:

a hopper having an inlet opening at a top end thereof and a discharge opening at a bottom end thereof;

means connected between said hopper and the roof for locating said inlet opening below the roof opening to receive the material dumped therethrough;

a pan rotatably mounted below said bottom end and capable of holding the material, the pan having an upper edge disposed higher than the lower edge of said bottom end;

means for rotating said pan whereby to throw the material therefrom; and control means attached to said hopper and responsive to the material therein, said control means operable to operate said pan rotating means only when the material has filled the pan to the hopper discharge opening and fills the hopper to a predetermined level therein, thereby ensuring a constant spreading pattern resulting in level filling of the grain bin.

2. In an assembly as defined in claim 1, and further wherein an opening is formed within the bottom of said pan, said opening having a maximum size less than the width of said discharge opening, and with a device for adjusting the size of said pan opening from between the maximum to completely closing said pan opening.

3. In an assembly as defined in claim 2, and further wherein a depending circular wall is formed on the underside of said pan and encompasses said opening, whereby to direct the material as it falls through said pan opening upon rotation of said pan.

4. The process of spreading granular material dumped into a conventional grain bin having a roof comprising:
   catching the dumped material;
   holding the caught material;
   piling up the material caught and held; and
   rotating said caught material so as to fling it upwardly and outwardly against the roof and into the bin where it falls to the floor.

5. The process of spreading granular material as defined in claim 4, and further directing the material as it piles up against a movable member for starting rotation of said caught material in response to the piling up of the material.

* * * * *